United States Patent

[11] 3,567,895

[72] Inventor Oded Paz
Poughkeepsie, N.Y.
[21] Appl. No. 849,029
[22] Filed Aug. 11, 1969
[45] Patented Mar. 2, 1971
[73] Assignee International Business Machines
Corporation
Armonk, N.Y.

[54] TEMPERATURE CONTROL SYSTEM
16 Claims, 17 Drawing Figs.
[52] U.S. Cl. ....................................... 219/10.77,
219/10.43
[51] Int. Cl. ....................................... H05b 9/06,
H05b 5/00
[50] Field of Search .......................... 219/10.77,
497, 10.43, 10.57, 10.71, 10.79, 10.75; 23/273,
301; 236/78 (B), 15 (B); 203/2

[56] References Cited
UNITED STATES PATENTS
2,813,186  11/1957  Bock ............................. 219/10.61
2,916,593  12/1959  Herrick ......................... 219/10.77X
2,992,311   7/1961  Keller ........................... 219/10.77
3,097,283   7/1963  Giacchetti ..................... 219/10.77
3,136,876   6/1964  Crosthwait .................... 219/10.77
3,150,064   9/1964  Dobson ......................... 202/206
3,174,298   3/1965  Kleiss ........................... 62/211
3,180,974   4/1965  Darling ......................... 219/497

Primary Examiner—J. V. Truhe
Assistant Examiner—L. H. Bender
Attorneys—Hanifin and Jancin and Melvyn D. Silver ABSTRACT: A temperature control system useful for epitaxial growth of silicon wafers in a reactor comprising in one embodiment an RF feedback loop and two temperature feedback loops, e.g. a thermocouple loop and an optical sensor loop. The structure and method disclosed generate error signals so that correctional factors sequentially derived, in cascade form from the optical sensor loop, the thermocouple loop and the RF loop, provide a resultant signal employed to correct the reactor temperature.

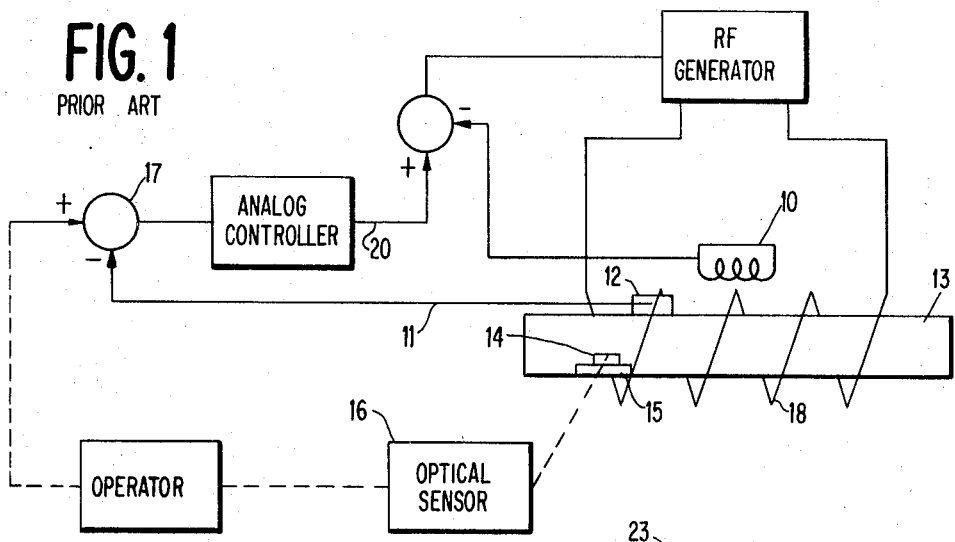
FIG. 1 PRIOR ART
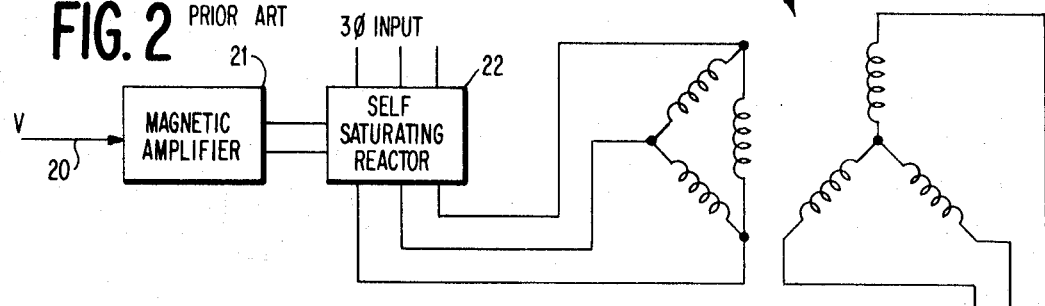
FIG. 2 PRIOR ART
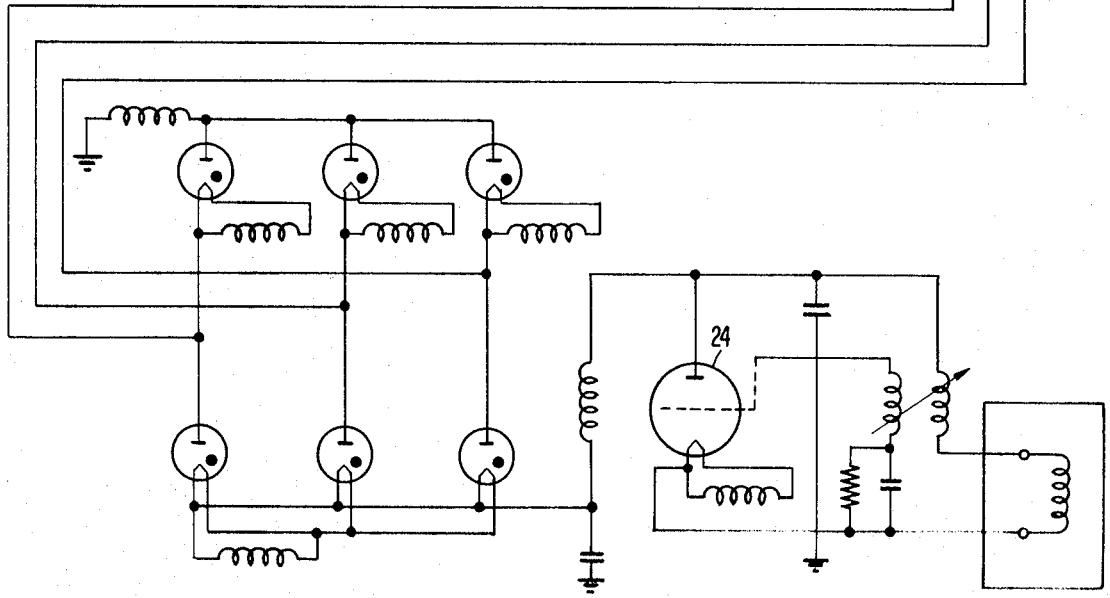
INVENTOR
ODED PAZ
BY *Melvyn D Silver*
AGENT

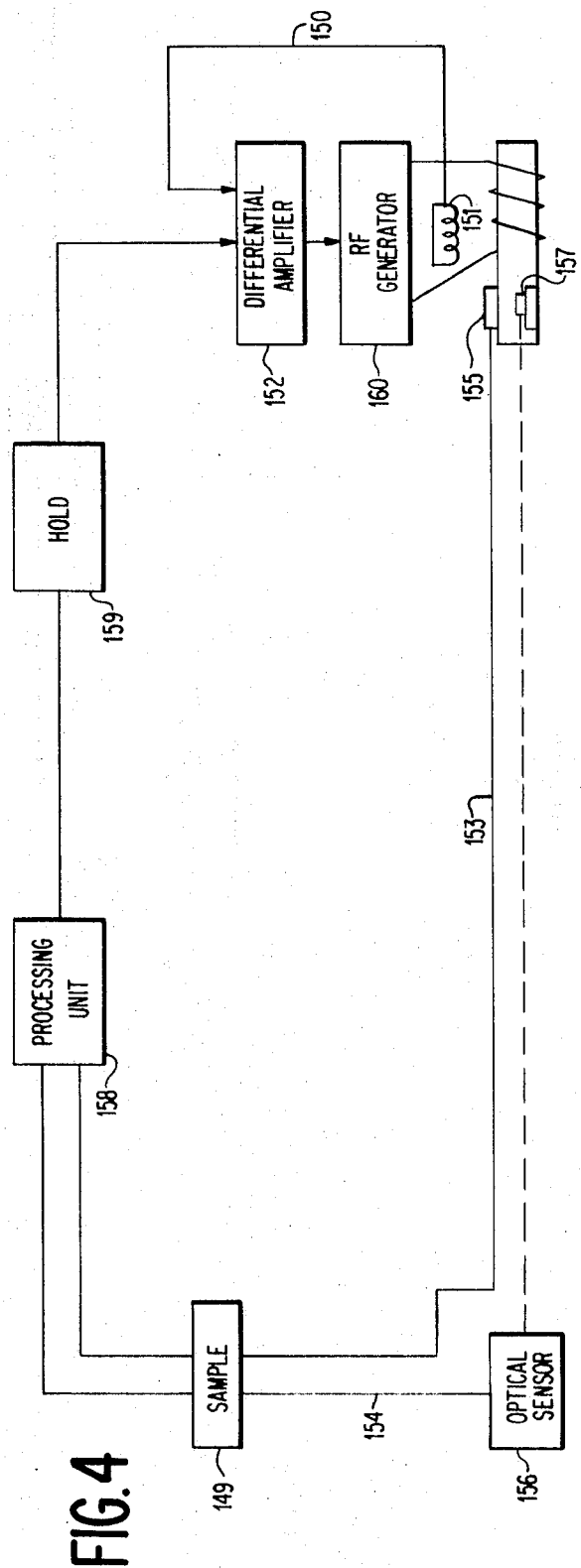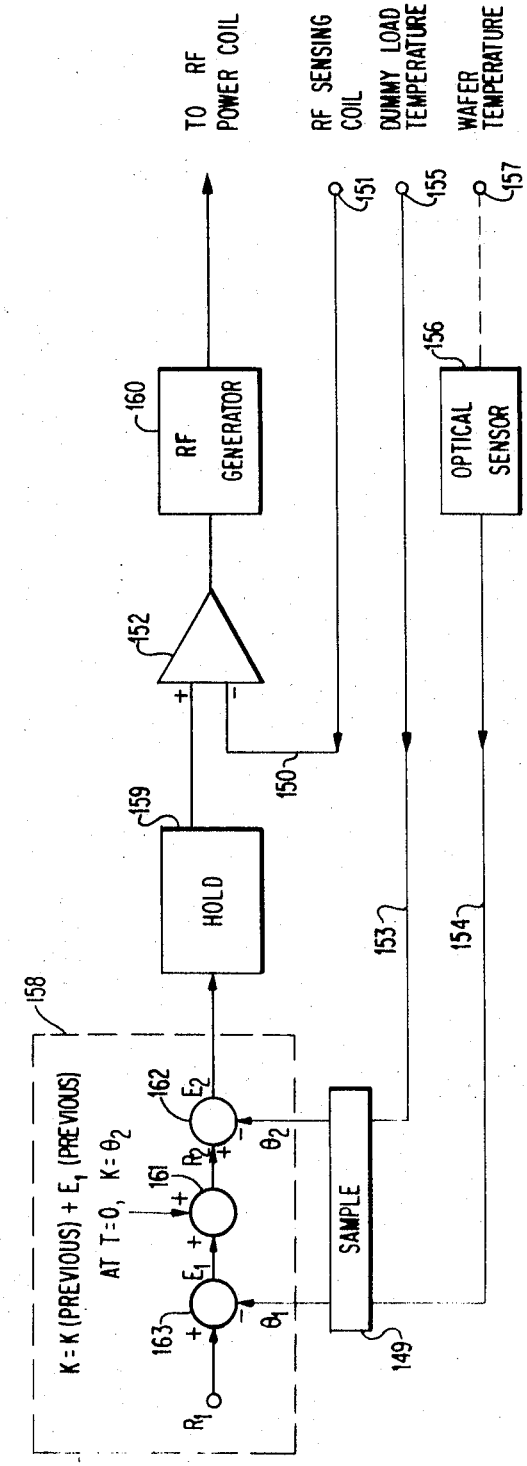
FIG.4
FIG.5

TEMPERATURE CONTROL SYSTEM

FIELD OF THE INVENTION

Systems for and methods of controlling the temperature in a heating system. Such control systems and methods include sensors such as thermocouples and pyrometers, and other sensing means, as well as digital and analogue controllers for controlling heat energy input to the vessel, reactor, or object being heated.

BACKGROUND OF THE INVENTION

Epitaxial growth is a technique in the manufacturing of semiconductor devices. The technique involves arranging, for example, silicon atoms upon a single crystal silicon substrate so that the lattice structure of the resulting layer is an exact extension of the substrate crystal structure. The basic chemical reaction that takes place during the growth process is the hydrogen reduction of silicon tetrachloride,

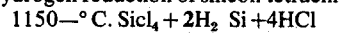

$$1150-°C.\ SiCl_4 + 2H_2 \rightarrow Si + 4HCl$$

this gas phase reaction, a gas which contains silicon atoms is passed over the substrate. Silicon atoms released from the gas phase by the reaction attach themselves to the substrate crystal structure. The elevated temperature required for the process varies from 1150° C. to 1250° C., depending on the desired growth rate. In addition to growing epitaxial layers of intrinsic silicon, it is possible to grow layers with impurity concentration, by adding doping gases such as boron, to the gas phase.

A system for growing epitaxial layers generally contains three basic parts: the reaction chamber, the feed system, and the heating source, generally an induction generator.

The reaction chamber usually consists of a long quartz tube with inlet and outlet at opposite ends, encircle by an induction coil. Silicon wafers are placed on rectangular graphite blocks, called boats, which move slowly at a constant rate through the reaction chamber. Heating is obtained indirectly by inductive heating of the boats upon which the wafers are lying.

The feed system supplies $H_2$, $SiCl_4$, and the doping gases required and controls their quantities. Automatic control of gas flow is achieved in the system by well known means, and will not be discussed further.

The induction generator (also called an RF generator) supplies, for example, 50KW output power at 6000V and 350kHz. The current in the induction coil generates a magnetic (and electric) field whose direction is parallel to the axis of the coil. The changing magnetic flux induces eddy currents in the graphite boats which, in turn, produce the heating effect. The developed heat is proportional to the RF current, its frequency, the resistivity of the material, and its permeability.

Temperature is only one of the variables affecting epitaxial growth, but it is the hardest to control. When making semiconductor devices using the epitaxial technique, it is important to keep the product characteristics uniform from wafer to wafer within a run, and from run to run. Two characteristics, film thickness and resistivity, are temperature dependent; hence, their uniformity requires precise temperature control. The function of a temperature control system is to insure temperature repeatability from run to run. When RF heating is used temperature is controlled by the power supplied to the induction coil. Temperature uniformity with respect to position in the reaction chamber, however, can only be effected manually, by varying the pitch of the induction coil.

With increasing speed of semiconductor devices, greater accuracy than in these prior systems, especially as to diffusion and growth rates, is required. While prior art systems have been sufficient for past needs, future demands for accurate device control via precise temperature control require improved temperature control systems.

Thus, it is an object of this invention to allow the improved maintenance of accurate temperature control in a reactor system.

Another object is to allow improved control of epitaxial growth of semiconductor wafers in a reactor by allowing improved temperature control.

Another object is to provide improved continuous control of reactor temperature, and thus, wafer temperature, in either a continuous flow or batch processing system.

SUMMARY OF THE INVENTION

The method and structure of this invention utilize a closed loop system for maintaining a desired temperature in an epitaxial reactor of a continuous or batch processing line by utilizing two temperature sensors and a rapid control method.

The system in one embodiment includes a conventional RF feedback loop and two temperature feedback loops, e.g. a thermocouple loop and an optical sensor loop, all sensing the same general area. A thermocouple is mounted in a susceptor material disposed between an induction coil and a quartz reactor tube disposed in a concentric arrangement thereto. In turn, an optical sensor scans the average surface temperature of wafers mounted on a carrier (of susceptor material) traveling within and through the quartz tube.

In its broadest context, the optically sensed temperature is compared with a set point temperature to generate an error signal for correlation with the temperature sensed by the thermocouple loop which in turn generates a second error signal for correlation with the RF loop to provide a resultant signal which is employed to correct the reactor temperature. In effect, correctional factors are sequentially derived, in cascade form from the optical sensor loop, the thermocouple loop, and the RF loop.

The invention will best be understood when read in conjunction with the following drawings and general description.

IN THE DRAWINGS

FIG. 1 shows a prior art temperature control system for epitaxial growth systems.

FIG. 2 shows a prior art parallel schematic of the RF generator of FIG. 1.

FIG. 4 shows a block diagram of a temperature control system.

FIG. 5 shows a block diagram of temperature control loops.

GENERAL DESCRIPTION

I. Prior Art

Figure 3:
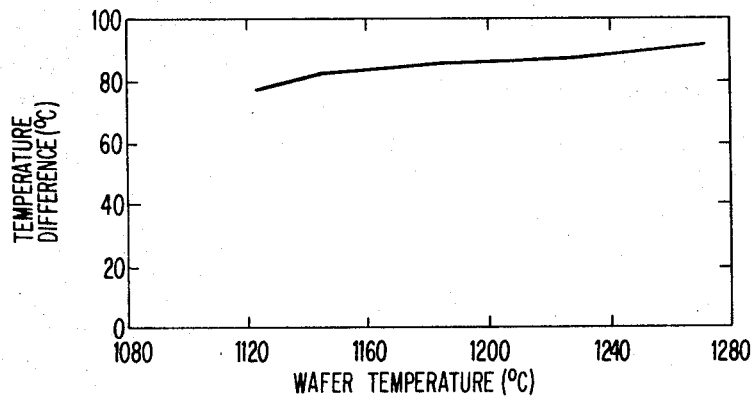
FIG. 3 shows the temperature difference between the product and the control thermocouple in a system such as that of FIG. 1.

One prior art control system is a control unit that provides four control modes: proportional, reset, rate, and rate of approach. One such prior art control system is shown in FIGS. 1-3.

This system comprises an RF pickup coil 10, thermocouple 11, optical sensor 16, and set point adjusting means 17. The function of the RF pickup coil 10 is to sense changes in RF power and to provide for fast compensation for line voltage changes. Temperature is measured by a thermocouple 11 mounted in a stationary graphite block 12, acting as a "dummy load." This "dummy load" is located between the coil 18 and the quartz reactor tube 13. The temperature of the dummy load monitored by the thermocouple 12 is expected to vary only with a change in the magnetic field strength and is therefore proportional to the temperature of the boats 15. Since the dummy load 12 temperature and the wafer 14 temperature are known to differ, it is necessary to measure the wafer temperature off line with an optical sensor 16 such as an optical pyrometer and adjust the set point via set point adjusting means 17 to the controller to compensate for the difference in temperatures.

RF power output is regulated by the system shown in FIG. 2. The analogue controller output voltage 20 is supplied to the control winding of a magnetic amplifier 21. The magnetic amplifier 21, in conjunction with a SCR driver, is used to drive a three-phase self-saturating reactor 22 which is in series with the lines feeding the primary circuit of the plate transformer 23. The high secondary voltage is delivered through the rectifier tube to the plate of the induction heating oscillator 24. By varying the control voltage, the plate voltage and therefore the power output, may be varied.

The relation between the thermocouple reading and the product temperature for such a system, under controlled conditions, was determined by procedures described later and is plotted in FIG. 3. The difference between the product and the control thermocouple is plotted on the ordinate; the wafer temperature is plotted on the abscissa. The difference is seen to vary between 78 to 91° C. It is possible to use this relation in making a new set point. However, since a change in system variables, such as an increase in ambient temperature experienced after several runs, will influence this relation, accurate control of the wafer temperature will not result.

Thus, this prior art system attempts to regulate or control object (wafer) temperature in a reactor system by a gross temperature reading, with manual adjustments being made from time to time depending upon a manually taken optical sensor reading. This results in a large and unacceptable temperature variation. Neither such manual adjustment nor such time variable use of such adjustment is desirable in a reactor system, especially for epitaxial semiconductor wafer growth. While the RF heating system may be replaced with other heating systems, the temperature control problems above still are present.

II. The Invention

A. Detailed Description

The temperature control system of this invention alleviates the prior art control problems by providing rapid, automatic temperature reading inputs to a data acquisition system, and by correlating such inputs in a given manner, generates an error signal for rapid and continuous heat input correction, as to the RF coil. For initial clarity, the invention will first be described in a preferred embodiment.

FIG. 4 is a block diagram of the temperature control system of the preferred embodiment of this invention. The system includes three control loops; an RF feedback loop 150; a thermocouple feedback loop 153; and an optical sensor feedback loop 154.

The function of the RF pickup loop 150 is to provide fast compensation for line voltage changes. This voltage variation affects the plate voltage to the oscillator tube, as discussed previously, and, hence, the amount of power output generated. The coil 151 generates an AC signal which is rectified and fed back. Over a small range this feedback signal is proportional to the controller output voltage. This DC signal is supplied as an input to differential amplifier 152, which generates an error voltage proportional to the difference between the controller output voltage and the feedback signal.

The thermocouple loop 153 via the thermocouple placed in the dummy block 155, and the optical sensor loop 154 via an optical sensor such as a radiation pyrometer 156 focused upon the wafer 157 provide a voltage output that is proportional to the temperature sensed. These signals are inputs to a sampling means 149, which samples the incoming signals on a time basis, discussed later. The output from sampling means 149 is then input to a processing means 158, which processes the input signal in a manner described below in conjunction with FIG. 5, and inputs a resultant error signal to hold means 159, from which a final signal is input to the differential amplifier 152, to control power output of the RF heating system via control of the RF generator 160.

This processing unit may be, for example, an IBM 1800 Data Acquisition System, where incoming signals are filtered, multiplexed, amplified, converted to digital form, processed, reconverted to analogue form, sampled, and fed back to the differential amplifier.

FIG. 5 is a block diagram of the temperature control loops, 153 and 154, input to sampling means 149 and then processed in processing unit 158, then input to hold means 159 which holds the signal for a given time interval related to the sampling time, to allow a continuous signal output to be input into differential amplifier 152, for control of the RF generator 160. WITHIN FIG. 5 is shown part of the function of processing means 158, wherein the desired error signal $E_2$ is generated, and then fed into hold means 159.

Thus, briefly, a thermocouple sensing means is located adjacent to the reactor to sense a gross temperature related to the internal temperature of the reactor, and generates a voltage or signal related to the temperature sensed. Similarly, optical sensing means is focused upon the object to be heated within the reactor, generating a voltage or signal related to the temperature of the object upon which it is focused. These sensing means are related to the overall structure as shown above, and in operation coact as shown below.

B. Operation

In operation, a first set point signal $R_1$ is generated, said signal related to the temperature at which it is desired to heat the object being heated, such as the semiconductor wafer. This first set point signal is then compared in comparing means 163 with the optically-sensed voltage $\Theta_1$, from the optical sensor loop 154, the difference between the first set point voltage $R_1$ and the optically-sensed voltage $\Theta_1$ constituting a first error voltage $E_1$.

Next, a $k$ factor is generated, comprising the sum of the prior occurring $K$ factor and the prior occurring first error voltage $E_1$, the initial $K$ factor at time equal to zero being made equal to the thermocouple sensed signal $73_2$ at time equal to zero. In second comparing means 161, the first error signal $E_1$ and the $K$ factor are added, the sum constituting a second set point signal $R_2$. Third comparing means 162 compares second set point signal $R_2$ with the thermocouple sensed signal $\Theta_2$, the difference constituting a second error signal $E_2$. This is a desired error signal. This error signal is then input to hold means 159 whose function is described later.

$\Theta_2$ represents the temperature of dummy load 155 that is located near the quartz tube of the reactor. Its temperature is stable, depending mainly on the magnetic field strength, but it does not reflect the temperature of the product accurately.

$\Theta_1$ reflects the wafer temperature measured accurately with a radiation pyrometer. Since the product may be moving from one end of the furnace to the other, this reading is not always available, i.e., at times the sensor will not be focused on the wafer. Therefore, this loop is sampled much less frequently than the thermocouple sensing loop 153.

The optically sensed temperature is first corrected using a predetermined emissivity value, discussed later. As stated, this optically sensed temperature is compared with the set point temperature $R_1$ that is generated to the processing unit. The wafer and the dummy load are at different temperatures. Hence, in order to apply the resultant error term $E_1$ as a set point to the thermocouple control loop, it is necessary to know the relationship between these two temperatures. In general, this relationship will depend on some known and some unknown independent factors such as gas flow rate, boat speed, and reactor heatup. This relationship is determined on line. $E_1$ is summed with a constant error term. This error term is updated based on optical samplings of the wafer temperature using the following equation:

$$k(\text{NEW}) = k(\text{PREVIOUS}) + E_1(\text{PREVIOUS}) \quad (1)$$

The resultant error term is the set point to the thermocouple controlled loop 153.

The complementary relationship between the dummy load temperature and the optically sensed temperature is best illustrated with an example. Referring to FIG. 5 assume:

$R_1 = 1200°$ C. is the set point
at time $= t$ assume the following readings
$\Theta_1 = 1180°$ C.
$\Theta_2 = 1098°$ C.
$E_1(t_0) = R_1(t) - \Theta_1(t_0) = 1200° - ° = 20°$ C.
Initially $k$ is taken as $\Theta_2$.
$R_2 = E_1(t) + k(t_0) = 20° + 1098° = 1118°$ C.
$E_2 = R_2(t) - \Theta_2(ta[0]) = 20°$ C.

As expected, the temperature drop seen by the optical sensor loop is also seen by the other loop.

at time $= t + T$ assume the following:
$\Theta_1 = 1205°$ C.
$\Theta_2 = 1119°$ C.
$E_1(t_0+T) = R_1 - \Theta_1(ta[0+T]) = -5°$ C.
$k(t+T) = k(t_0) + E_1(ta0) = 1118°$ C.
$R_2(t_0+T) = E_1(t+T) + k(t_0T) = -5° + 1118° = 1113°$ C.
$E_2 = R_2(t+T) - \Theta_2(t_0+T) = -6°$ C.

This error correction continues until $E_1$ equals zero at which time $R_2$ remains constant.

This error signal $E_2$ is now input to hold means 159. It is thus necessary to consider loop response times, to determine sample times for sampling means 149 and frequency of signal output from the hold means 159 to differential amplifier 152. The purpose of this is so that the sample means can input signals to the processing unit that are meaningful, as a time response is associated with the temperature sensors to reflect a change in temperature, such change being evident as a change in signal voltage for such sensors. The hold means will hold the resultant error signal for this time interval, until a new signal is generated.

It is assumed that the response of the RF pickup loop 150 is about 10 times faster than the temperature response. This assumption is verified by comparing Bode plots for the RF power and for the dummy load temperature. Therefore, only of concern is the forward path of the Rf loop transfer unction, which is included in the dummy load transfer function. Similarly, since the wafer temperature is sampled at a much slower rate than the dummy load temperature, variations in it are treated as set point changes.

From the Bode plots in FIGS. 14 and 15, discussed later, obtain the following transfer function:

$$G(s) = \frac{A}{(s+.0095)(s+.095)^2} \quad (2)$$

where $$A = 24.4 |(j\omega+.0095)(j\omega+.095)^2|_{\omega=.007} = 2.62 \times 10^{-3} \quad (3)$$

combining $G(s)$ with the zero order hold;

$$\frac{\theta}{U} = \left[\frac{(1-e^{-st})}{s} \frac{A}{(s+.0095)(s+.095)^2}\right] \quad (4)$$

proceed to expand in partial fractions and obtain:

$$\frac{\theta}{U} = (1-e^{-st})\left[\frac{30.7}{s} - \frac{38.3}{(s+.0095)} + \frac{7.29}{(s+.095)} + \frac{.325}{(s+.095)^2}\right] \quad (5)$$

In a digital control system, the system must be described in sampled data form. Before converting to $z$ transform notation, a sampling period must be picked. The sampling theorem states that, for a band limited signal, it is theoretically possible to recover completely the signal from its sampled form if the bandwidth of the former is limited to one-half the sampling frequency. Practical considerations require a sampling frequency of at least five times the bandwidth.

The bandwidth of the dummy load temperature response is taken as the crossover frequency of the logarithmic amplitude ratio plot.

Figure 14:
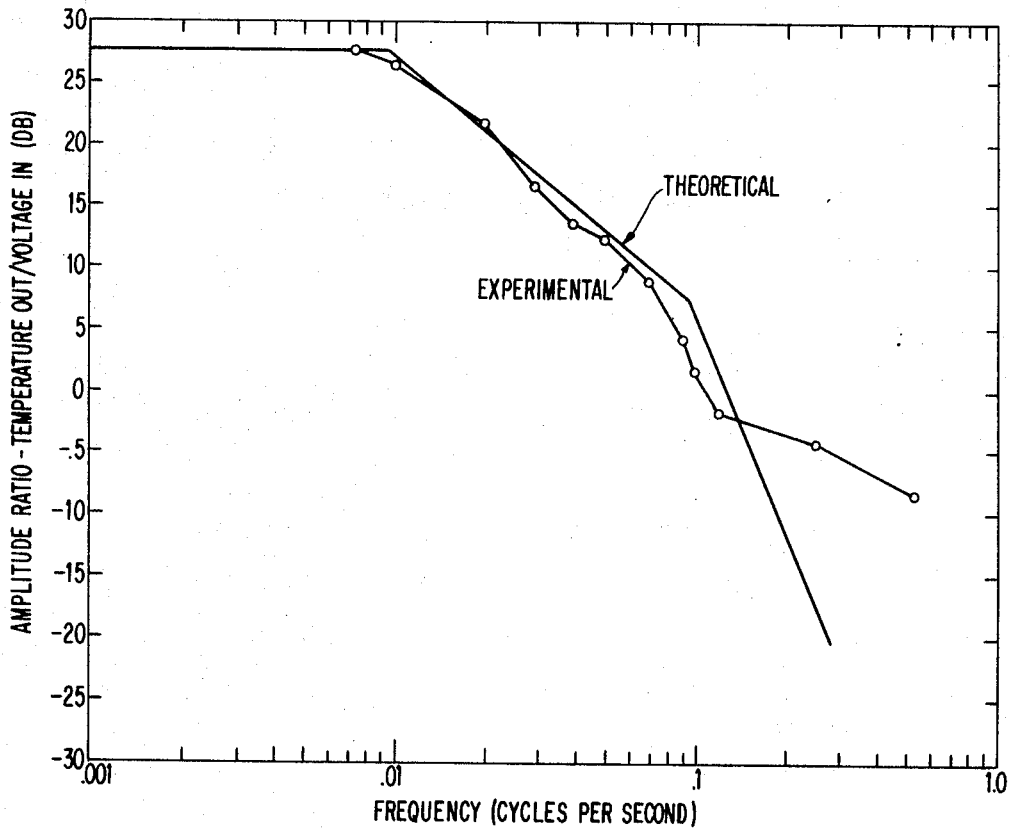
FIG. 14 shows the logarithmic amplitude ratio plot for the dummy load temperature.

FIG. 14 shows that the crossover frequency for the dummy load temperature response equals 0.11 cycles/second. Therefore, a sampling frequency of 1 cycle/second is reasonably higher. Hence the sampling period T is taken as 1 sec. higher.

Now apply the $z$ transform rules and obtain:

$$\frac{\theta}{U}(z) = (1-z^{-1})\frac{30.7}{1-z^{-1}} - \frac{38.3}{1-.9905z^{-1}} + \frac{7.29}{1-.9093z^{-1}} + \frac{.293z^{-1}}{(1-.9093z^{-1})^2} \quad (6)$$

after simplifications $$\frac{\theta}{U}(z) = G(z) = \frac{.31(-1+1.91z^{-1}-.4323z^{-2}-8.04z^{-3})}{(1-.99055z^{-1})(1-.9093z^{-1})^2} \quad (7)$$

factoring the numerator $$G(z) = \frac{.31(1+1.475z^{-1})(-1+3.385z^{-1}-5.432z^{-2})}{(1-.99055z^{-1})(1-.9093z^{-1})^2}$$

The transfer function contains a zero outside the unit circle at $-1.475$, and poles at $=.99055$ and $.9093$, the latter being a double pole.

To satisfy the requirement for ripple free, finite settling time response the prototype response function $K(z)$ must contain the zero of $G(z)$.

$$K(z) = (1+1.475z^{-1})(a_1z^{-1}) \quad (8)$$
$$1-K(z) = (1-z-1)(1+b_1z^1) \quad (9)$$

in equating terms, obtain two simultaneous relations:

$$a_1 = 1-b_1$$
$$1.475a_1 = b_1 \quad (10)$$

$$a_1 = .404$$
$$b_1 = .596$$

$$K(z) = .404z^{-1} + .596z^{-2} \quad (11)$$

Figure 6:
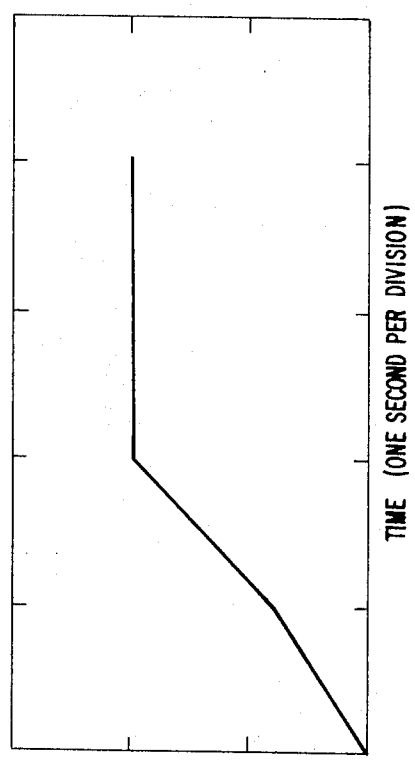
FIG. 6 shows the time response of the system for a set point change of 1° C.

The time response of the system for a step input is plotted in FIG. 6.

The pulse transfer function is computed now as:

$$D(z) = \frac{1}{G(z)} \frac{K(z)}{1-K(z)} \quad (12)$$

$$D(z) = \frac{.404z^{-1} - .539z^{-2} - .61z^{-3} + 1.246z^{-4} - .493z^{-5}}{-.31+.716z^{-1}-.188z^{-2}-2.79z^{-3}+1.08z^{-4}+1.49z^{-5}} \quad (13)$$

This response is implemented by storing the last five samples of the output.

Thus, the error signal $E_2$ is input to sampling means 149, which then utilizes a sampling period of 1 second. The output after processing is then input to the hold means, and then input to the differential amplifier 152, for ultimate control of the heating system via RF generator 160.

Thus, this invention automatically samples data from at least two functionally different points via thermocouple and optical sensors, utilizing a sampling period and error correction method designed to achieve accurate controllable temperature control in a reactor system. Manual reading errors and uncertain times of correction are eliminated, and a superior single correction—a final error signal—generated to correct and maintain the entire system.

While the invention has been described above, in a specific embodiment for clarity, it is important to understand the considerations and factors that allow the invention disclosed to function in the manner disclosed. This requires an understanding of (1) temperature measuring techniques and (2) direct process control.

1. Temperature Measuring Techniques

The well-known technique of measuring surface temperature by sensing thermal radiation is becoming increasingly popular in semiconductor manufacturing today. Hamlin in his article "Multiple IR Heads for Complete Control of Temperature and Growth Thickness in Epitaxial Reactors", IEEE International Convention Record, 1967, Part 14, pp. 52—57, describes a system (not shown) of three infrared sensors measuring the temperature of three reactor zones and feeding it to an analogue controller. This technique has the following distinct advantages over other techniques of temperature measurement: (1) Contact with the surface is not necessary, hence this technique can be use in cases where contact measurement is not feasible. (2) It is the only technique available in corrosive or otherwise hostile environments. (3) The technique has good sensitivity to very small temperature changes over fixed or moving objects. (4) It has very fast response in most cases because of the absence of thermal mass which limits the speed of response in thermal detectors.

Thermal radiation detectors thus have some clearly desirable characteristics.

Thermal radiation detectors are divided into two general categories: optical pyrometers and radiation pyrometers.

The measurement of temperature utilizing optical pyrometry is based on the fact that the spectral radiant intensity from an incandescent body is a function of temperature. If the body is black (radiating all the energy it absorbs), the spectral radiant intensity is related to the temperature according to Planck's radiation equation:

$$N_{b\lambda} = \frac{C_1 \lambda^{-5}/\pi}{e^{C_2/\lambda T} - 1} \quad (14)$$

$N_b\lambda$ the spectral radiant intensity at the wavelength $\lambda$ of a black body at a thermodynamic temperature $T$; $C_1$ and $C_2$ are the first and second radiation constants. Thus, if $N_b\lambda$ and the other parameters in equation (14) are known, it is possible to determine the temperature. Absolute measurements of radiation, however, are very difficult to take. Therefore, $N_b\lambda$ is generally measured relative to some standard spectral radiant intensity. This measurement is done by imaging the source whose temperature is to be determined onto the filament of the pyrometer lamp. Then the lamp intensity is varied until the filament disappears into the background of the source. A band-pass filter is used to limit the instrument bandwidth. The matching is done manually using the eye as a detector, or automatically, using a photomultiplier tube. The wavelength of the pyrometer is fixed according to the temperature range over which it will be used. Because objects at higher temperatures radiate at shorter wavelengths, pyrometers for temperatures above 1000° C operate in the visible spectrum. Optical pyrometers are accurate, and are often used to calibrate other sensors.

An optical pyrometer is used in the calibration procedure of this invention, and will be described later. Its readings are used as a reference to check the stability of the radiation pyrometer.

Figure 7:
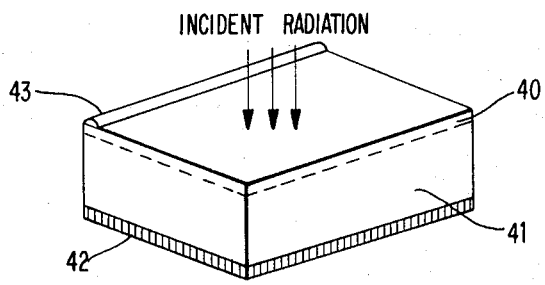
FIG. 7 shows the construction of a silicon cell as used in an optical sensor.

A radiation pyrometer is a device that collects thermal radiation from a target and then converts the thermal energy into an electrical signal. Only one type of radiation pyrometers is here described, the silicon cell, which is used to measure the wafer temperature. It is recognized that other types may be used. The silicon cell is a solid state device that generates an electric current when illuminated with near infrared radiation. The structure of a silicon solar cell is shown in FIG. 7. A thin layer of $p$—type silicon 40 is laid on a thicker layer of $n$—type silicon 41. The negative contact 42 is deposited on the back surface of the silicon, while a metallized strip 43 on the top surface forms the positive contact.

If the contacts are electrically connected through a suitable resistive load, a current flows in the circuit without the use of an external source. The current is proportional to the intensity of the incident radiation and, hence, to the temperature of interest.

Optical pyrometers and radiation pyrometers infer temperature by measuring radiated energy. Since radiated energy and temperature are related according to Planck's radiation law, the radiation pyrometer reading will be correct only for the case of a black body. Most real objects, however, do not radiate all the energy that they absorb; a part gets transmitted or reflected. Hence, most real bodies are not black bodies. Emissivity expresses the ratio of the energy radiated by a real body under a given set of conditions to the energy radiated by a black body under the same conditions. Emissivity values vary between 0 and 1, where unity is the emissivity of a black body. An uncalibrated sensor measuring a real body will therefore indicate a lower temperature than the true temperature. Emissivity is dependent on the material, surface condition, temperature and wavelength of the measuring instrument. Since the emissivity of, for example, silicon wafers varies widely, it is important to calibrate the sensors so that the true temperature may be known.

An empirical calibration method is here employed.

The purpose of this method is the following:

1. To obtain the temperature difference that might be expected between the temperature of the "dummy load" and the temperature of the wafer under fixed conditions.
2. To measure the emissivity of the wafer in the applicable temperature range.

The measurements are taken for the two types of optical sensors, however, the radiation pyrometer is of primary concern. The optical pyrometer is used to compare measurements and to evaluate the repeatability of the radiation pyrometer.

Figure 8:
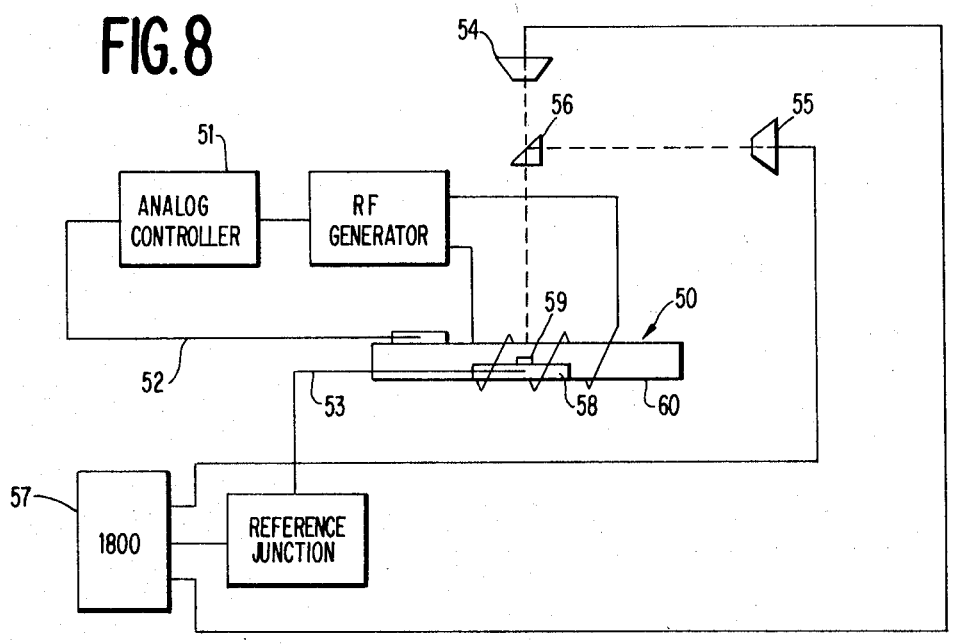
FIG. 8 shows a apparatus for calibration of optical sensors.

FIG. 8 shows a block diagram of the apparatus used in this calibration.

Thus, the apparatus includes epitaxial reactor 50 whose temperature is controlled by means of analogue controller 51 and a control thermocouple 52 via the RF generator. It further includes a measuring system consisting of a measurement thermocouple 53 embedded in a carbon boat 58 and the optical sensors, radiation pyrometer 54, prism 56, and optical pyrometer 55. The recording system consists of a plata aquisition system, such as an IBM 1800 Computer 57, program controlled to sample the points and list the results.

The black body used for calibration consists of carbon block 50 with a hole paralleling its long axis. The measuring thermocouple 53 is inserted in this hole. The wafer 59 is placed on the block in a double notch arrangement for better temperature uniformity, and the center of the wafer is aligned with the thermocouple tip. Because of the close proximity of the thermocouple to the target area of the wafer, the thermocouple measures the thermodynamic temperature of the wafer.

The emissivity of the wafer for a given temperature and wavelength is computed using the following formula:

$$\epsilon = EXP\left\{\frac{C}{\lambda}\left(\frac{1}{T_T} - \frac{1}{T_B}\right)\right\} \quad (15)$$

where:
 $\epsilon$ = spectral normal emissivity
 $\lambda$ = effective wavelength of the sensors
  = 0.6450 microns for the optical pyrometer
  = 0.9 microns for the radiation pyrometer
 $T_T$ = Thermodynamic temperature
 $T_B$ = Brightness temperature (temperature sensed by the pyrometer)
 $C$ = a constant, 14380.0 micron °K In this system there is, beside emissivity, another factor that affects $T_B$. The sensors are sighted through the quartz tube 60 and there is some loss of thermal energy in the wall. There are also losses in the prism 56. In order to obtain $T_B$ this loss has to be accounted for. This is done by taking two measurements:

First, the sensors are sighted on the wafer 59. Readings of the sensors ($T_b'$) and of the measuring thermocouple 53, are taken.

Second, the sensors are sighted on an opening in the carbon block 58 (emissivity≈1) in the near proximity of the thermocouple 53 tip. Again readings of the sensors 54, 55 and of the measuring thermocouple 53 are taken. The temperature difference due to losses in the quartz and prism wall $\alpha T$ is then computed and added to $T_B'$.

$$T_B = T_B' + \alpha T$$

Measurements are taken over a range of 165° C at 10° C intervals. The temperature is changed by varying the set point for the control thermocouple 52. All three sensors 53, 54, 55 provide voltage inputs to the 1800 system and are scanned simultaneously. The readings are averaged by the computer with an average taken every 10 readings (4 sec.). Temperature stability of 1° C is insured before taking a calibration point.

Figure 9:
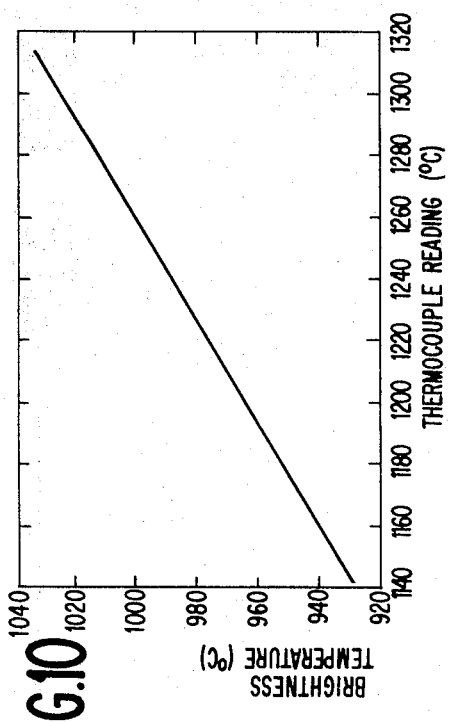
FIG. 9 shows the measurement of uncompensated brightness temperature using an optical pyrometer.
Figure 10:
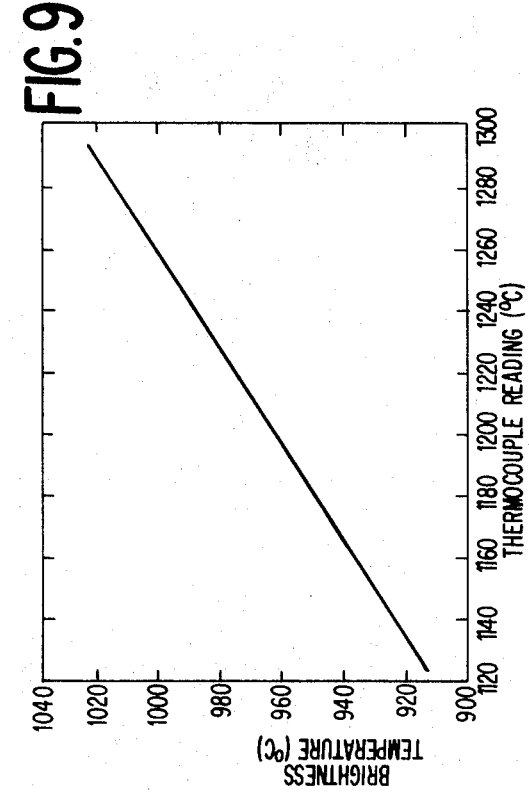
FIG. 10 shows the measurement of uncompensated brightness temperature using a radiation pyrometer.
Figure 11:
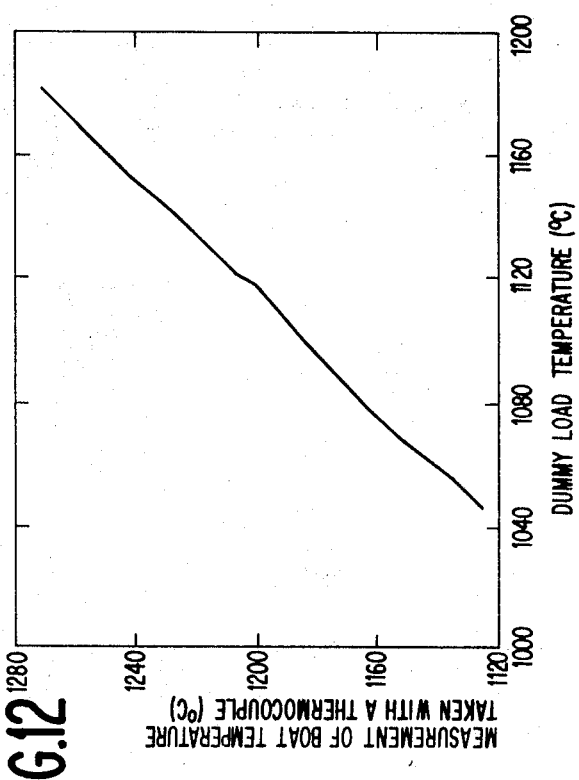
FIG. 11 shows the measurement of brightness temperature compensated for attenuation in intervening media.

FIGS. 9—11 show the comparison of uncompensated and compensated temperature readings on this calibration.

FIG. 9 and FIG. 10 plot the uncompensated brightness temperature for the optical pyrometer and for the radiation pyrometer respectively. FIG. 11 is the plot of the brightness temperature compensated for losses in the prism and quartz wall in the case of the radiation pyrometer.

The plot shows that the radiation pyrometer readings are lower by a constant amount from the optical pyrometer readings.

Note that in FIGS. 9 & 10 the two scales are different. If they are made equal, the two plots show approximately the same values. The apparent discrepancy between these plots and FIG. 11 is explained by the fact that in the case of the optical pyrometer, there is a reduction in radiant intensity due to losses in both the prism and the quartz wall. In the case of the radiation pyrometer, here are only losses in the quartz wall. The additional losses in the optical pyrometer measurements made the readings appear identical. In FIG. 11, where the readings are compensated for losses, the difference between the plotted points is evident.

The emissivity values are computed using formula (15) and are based on a linear curve fitting. The values are as follows:
For the Optical Pyrometer
$\epsilon \approx 0.30$   $1140 \leq T \leq 1280°$ C.
For the Radiation Pyrometer
$\epsilon \approx 0.38$   $1140 \leq T \leq 1280°$ C.

The emissivity correction is applied to the wafer measurement as described in the section on the control system, discussed later.

Figure 12:
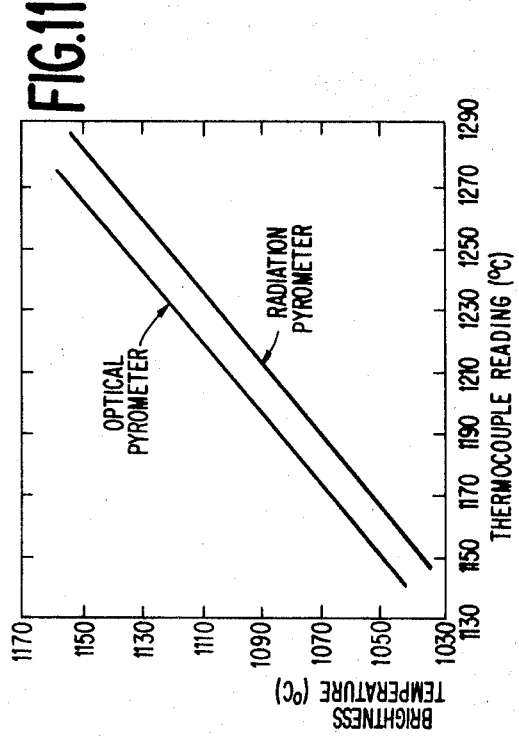
FIG. 12 shows the temperature difference between the boat and the dummy load in an epitaxial system.

FIG. 12 shows the relation between the control thermocouple reading and the product temperature as monitorized with the measurement thermocouple under controlled conditions.

2. Direct Control of Process

Experimental frequency response data is needed for design of the parameters employed in the sampling means. This data is used to determine the loop transfer functions, discussed previously in connection with FIG. 5.

a. Theoretical

The determination of a transfer function when a forcing function is applied at the input, and a response is measured at the output is a well-known way of arriving at the dynamic characteristics of a linear time-invariant system. When initial conditions may be ignored, the relationship between the input forcing function and the output response function is given by:

$$\text{Transfer Function} = \frac{\text{Output Response}}{\text{Forcing Function}}$$

A straightforward way of testing system dynamics is to apply a sinusoidally varying input at a given frequency and observing the steady state amplitude and phase of the response. This procedure is then repeated for different frequencies. Normally, it will be required to cover at least two decades of frequency. The input and output quantities are recorded simultaneously. The test is sustained long enough to permit the initial transients to disappear, leaving only the steady state conditions. Several complete cycles are generally required before the transient characteristics of the output signals become negligible.

Certain assumptions are made in determining these frequency response relationships.

Assume that the behavior of the system can be described by an $n^{th}$ order linear differential equation with constant coefficients. Designate as $x(t)$ the input to the system, or the independent variable and $y(t)$ $y(t)$ the output of the system, or the dependent variable. Further assume zero initial conditions of $y(t)$ and $4(t)$ and their first $(n-1)$ and $(m-1)$ derivatives, respectively:

$$a_0 y(t) + a_1 \frac{dy(t)}{dt} + a_2 \frac{d^2 y(t)}{dt^2} + \cdots a_n \frac{d^n y(t)}{dt^n}$$
$$= b_0 x(t) + b_1 \frac{dx(t)}{dt} + b_2 \frac{d^2 x(t)}{dt^2} + \cdots b_m \frac{d^m x(t)}{dt^m}; \; n \geq m \quad (16)$$

$$y(0) = y'(0) = \ldots y^{n-1}(0) = 0 \quad (17)$$
$$x(0) = x'(0) = \ldots x^{m-1}(0) = 0 \quad (18)$$

Now apply a sinusoidal excitation at the input:
$$x(t) = a \sin \omega t \quad (19)$$
and solve for the response $y(t)$.

Rewriting (16) in summation notation:

$$\sum_0^n a_k \frac{d^k y(t)}{dt^k} = \sum_0^m b_k \frac{d^k X(t)}{dt^k} \quad (20)$$

and taking the Laplace transform of (8), $$\left(\sum_0^n a_k s^k\right) Y(s) = \left(\sum_0^m b_k s^k\right) X(s) \quad (21)$$

Let $$N(s) = \sum_0^m b_k s^k \quad (22)$$

$$D(s) = \sum_0^n a_k s^k \quad (23)$$

$$Y(s) = \frac{N(s)}{D(s)} \frac{A\omega}{s^2 + \omega^2} \quad (24)$$

Let $$G(s) = \frac{N(s)}{D(s)} \quad (25)$$

The steady state response of $Y(s)$ comes from the pure imaginary poles of the driving function or the pure imaginary poles of $G(s)$.

Assume that the real part of the poles of $G(s)$ are negative, therefore $G(s)$ can not have pure imaginary poles. Hence, only the poles of the driving function contribute to the steady state response.

It follows that the steady state response of the system is:

$$y_{ss} = \sum \text{ residues of } G(s)\frac{A\omega e^{st}}{s^2 + \omega^2} = G(s)\frac{A\omega e^{st}}{(s+j\omega)}\bigg|_{s=j\omega}$$
at $s = j\omega; s = -j\omega$
$$+ G(s)\frac{A\omega e^{st}}{(s-j\omega)}\bigg|_{s=-j\omega} = \frac{A}{2j}G(j\omega)[e^{j\omega t} - e^{-j\omega t}] \quad (26)$$

expressing $G(j\omega)$ as a product of magnitude and phase $$G(j\omega) = |G(j\omega)| e^{j\Theta(\omega)} \quad (27)$$

$$G(-j\omega) = |G(j\omega)| e^{-j\Theta(\omega)} \quad (28)$$

the following is obtained, $$y_{ss}(t) = A |G(j\omega)| \sin[\omega t - \Theta(\omega)] \quad (29)$$

The steady state response data is usually shown as Bode plots, one for the amplitude ratio and one for the phase angle.

Theoretically, it is not necessary to use sinusoidal forcing to arrive at the system response. The same information can be obtained by applying an arbitrary pulse-like disturbance to the input. For a linear system and arbitrary input $x(t)$, the technique is to obtain the Fourier transform of the independent and dependent variables.

The transfer function is obtained by dividing the dependent variable Fourier transform by that of the independent variable:

$$\frac{\int_0^{T_y} y(t)e^{-j\omega t}dt}{\int_0^{T_x} x(t)e^{-j\omega t}dt} = \frac{Y(j\omega)e^{j\phi_1(\omega)}}{X(j\omega)e^{j\phi_2(\omega)}} = \frac{1}{G(j\omega)} \quad (30)$$

Since both $y(t)$ and $x(t)$ are pulses and go to zero for finite time, they are Fourier transformable and the integrals may be evaluated for each value of $\omega$. This is done using numerical integration.

The pulse method is especially attractive for testing chemical processes since it can be conducted during normal production runs and can be implemented with readily available equipment.

b. Operation

Figure 13:
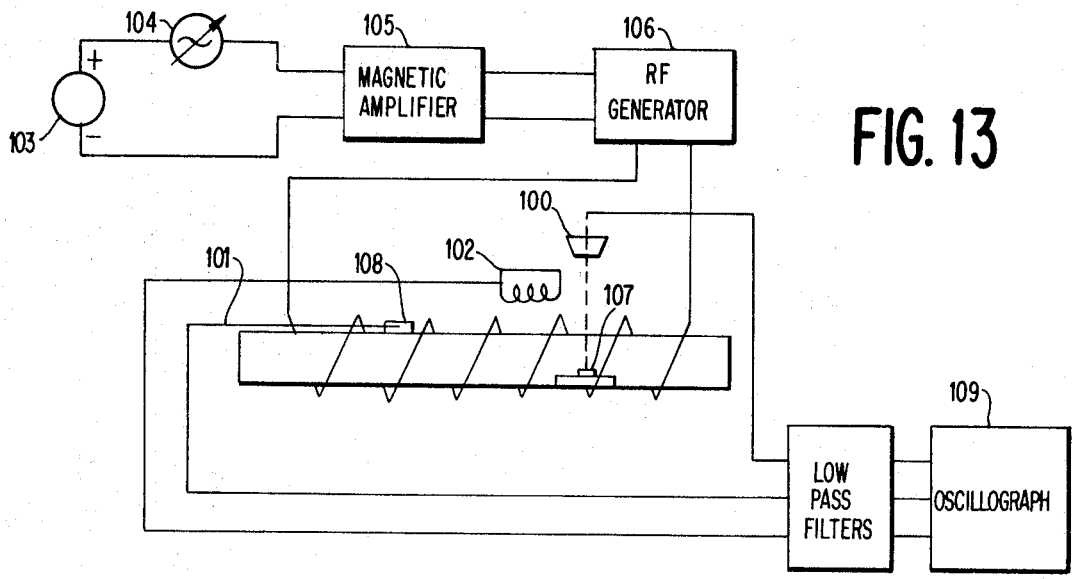
FIG. 13 is a diagram of an apparatus for testing frequency response.

A block diagram of apparatus for these measurements is shown in FIG. 13, showing radiation pyrometer 100, thermocouple 101, pickup coil 102, DC supply 103, signal generator 104, and related equipment.

The frequency response measurements thus taken help determine a suitable sampling rate, and obtain the open loop transfer function. This transfer function is used in the sampling procedures.

In operation, a sinusoidal disturbance is introduced at the input to the system by varying the control voltage to the magnetic amplifier 105. The response of three input variables is monitored. The variables are: the wafer 107 temperature, the dummy block 108 temperature, and the variation in power output sensed by the pickup coil 102.

The control voltage is varied by means of signal generator 104. The readings are taken at a typical operating range of the system, about 1150° C. First, the system is allowed to stabilize at that temperature and then the disturbance is introduced. The sine wave in this case is riding an 18V DC signal. The sine amplitude is 2V initially. In order to excite the system sufficiently at higher frequencies, it is necessary to increase the amplitude gradually up to 8V maximum. The system is allowed to reach steady state at each frequency.

The various variables are monitored by a multichannel oscillograph 109. Its fast response does not delay the output signals. Also, because of their fast responses, the radiation pyrometer 100 (1 ms) and the thermocouple 101 do not affect the measurements.

Figure 15:
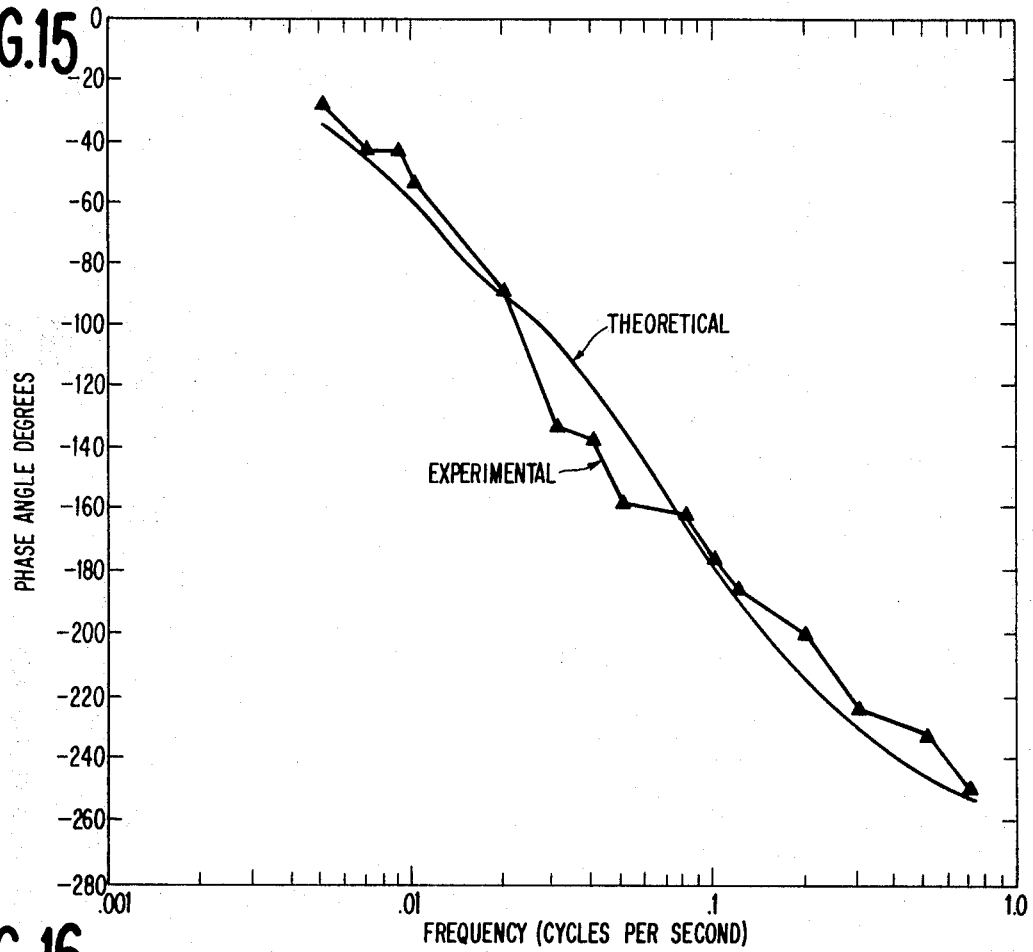
FIG. 15 is a phase angle plot for the dummy load and the wafer temperature.
Figure 16:
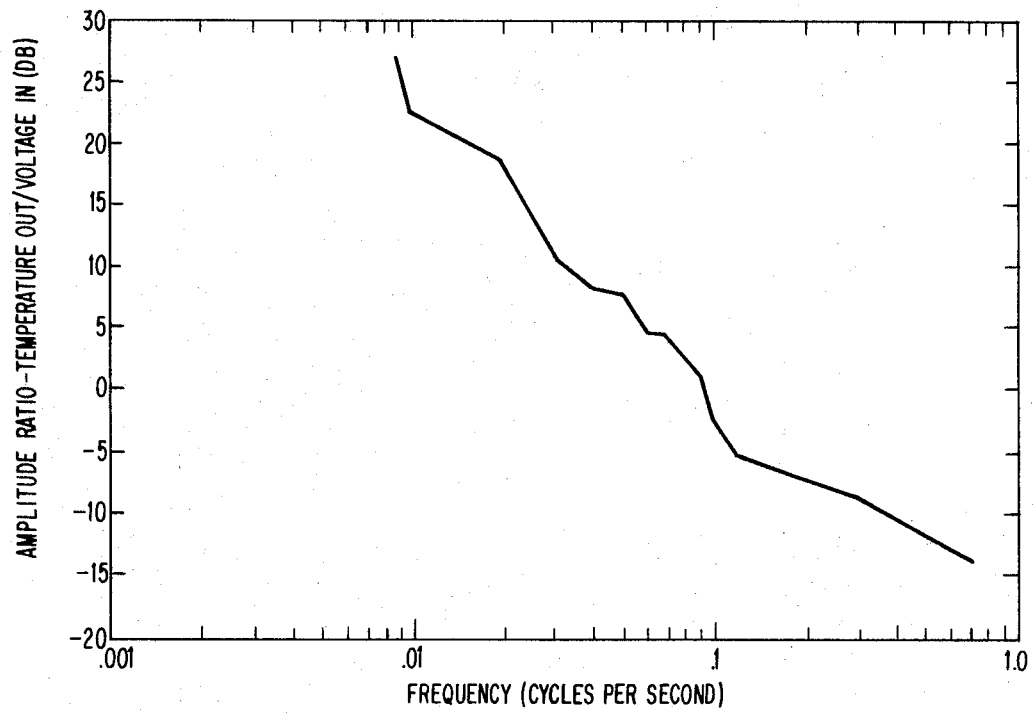
FIG. 16 is a logarithmic amplitude ratio plot for the wafer temperature.

The results are shown graphically in FIGS. 14—16, which Bode plots were used in determining the sampling period discussed previously in connection with FIG. 5.

The frequency response of the three output variables is shown graphically as Bode plots. The logarithmic amplitude ratio plot for the dummy load temperature is shown in FIG. 14. The transfer function is approximated by a third order system with a single pole at 0.0095 cycles/sec., and a double pole at 0.095 cycles/sec. The theoretical and experimental transfer functions are in good agreement except at above 0.12 cycles/sec. At this frequency range it is necessary to apply large amplitudes of the input disturbance in order to excite the system sufficiently. The system, under this condition, is probably no longer linear. The phase angle plot for both the dummy load temperature and for the wafer temperature is given in FIG. 15.

Figure 17:
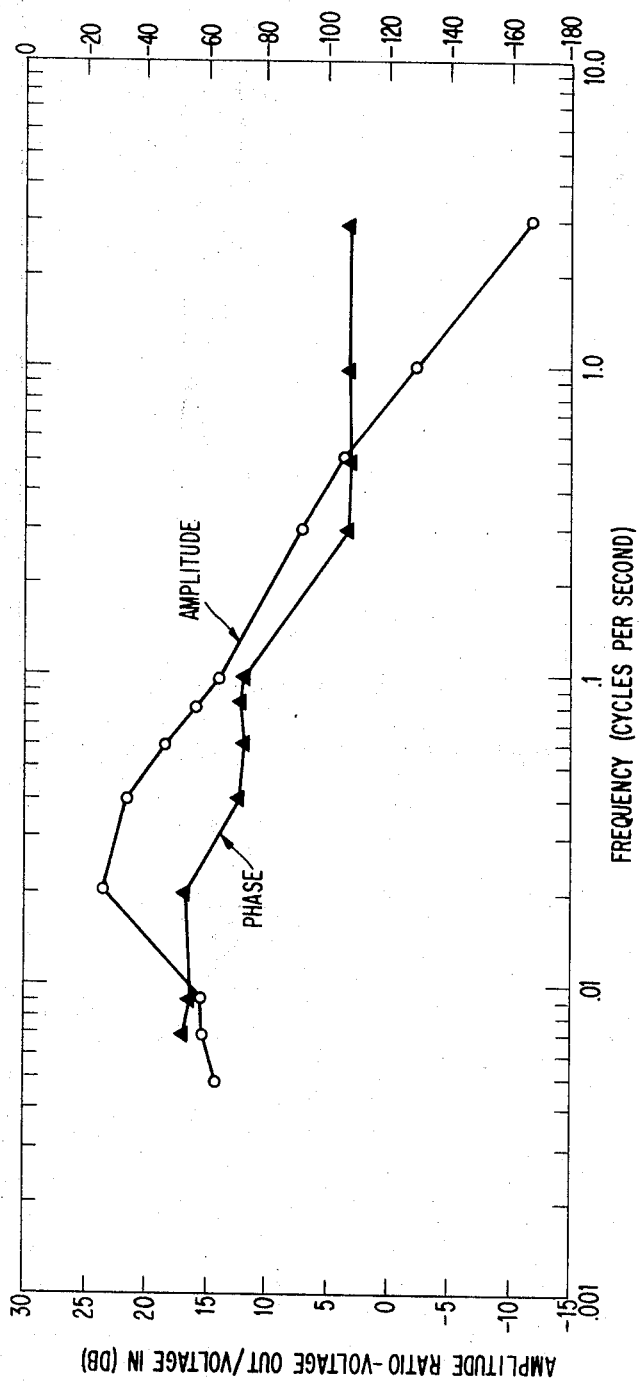
FIG. 17 is a logarithmic amplitude ratio and phase angle plots for change in power output.

The logarithmic amplitude ratio plot for the wafer temperature is shown in FIG. 16. The phase plot is not shown as this was almost identical to the phase plot shown in FIG. 15. As expected, the amplitude ratio plots are in agreement except that the wafer temperature has a lower DC gain. This is expected since the uncompensated reading of the wafer temperature was lower than the dummy load temperature. FIG. 17 is the logarithmic amplitude ratio and the phase angle for the RF power output. The band-pass is about 10 times higher than the temperature band-pass.

In the above experimental determinations, another correctional factor was necessary to nontheoretically perfect system conditions.

Some of the energy that is supplied to the induction heating escapes from the process and interferes with the operation of the IBM 1800 computer and other equipment that is present in the same room. The RF interference causes erroneous readings of the analogue signals applied to the 1800 system. The interference also causes the oscillograph readings to become noisy. Therefore, this noise problem must be solved before the work described above can be carried out.

Shielding the RF coil with an aluminum case is effective in greatly reducing the effect of the interference on the 1800 readings and practically eliminating the effect on the oscillograph readings. In addition to the shielding, low pass filters are installed on all the signal lines that are brought from the epitaxial system to the 1800. This reduces the noise to a tolerable level.

The following is a brief summary of these considerations and the reasons for them.

GENERAL SUMMARY

The increasing complexity and density of integrated circuits require close tolerances of the product specifications. Since temperature has a significant effect on the product characteristics in the epitaxial growth system, close temperature control is required to insure product uniformity. In order to improve the level of a control system it is necessary to measure the deposition temperature more accurately. The technique of radiation pyrometry provides a solution to this difficult problem. The transfer function of the system is determined experimentally from its frequency response. This method is preferred over the method of pulse testing because the desired test response is readily distinguished from other responses present in the system, and because it is believed to lead to a more accurate model of the system.

The advantage of this system compared to other systems is the more accurate control of the deposition temperature. However, another advantage is due to the use of Direct Process Control (DPC).

With a DPC system, control calculations such as the emissivity corrections are readily implemented in a computer which includes the processing means and sample and hold means. Also with a DPC system, individual hardware elements are replaced with the time shared components of the control computer. In a digital system, the measurement of analogue signals from the transducers is accomplished via multiplexed components in the analogue to digital converter section. Individual set point stations for each controlled variable are replaced by keyboards and switches that permit the operator to manually enter set points and other data for individual control loops. By utilizing multiplexed components, a data acquisition system such as the IBM 1800 system can sample and control about 100 loops per second with one analogue to digital converter.

The software required to implement the control algorithm is a part of a larger DPC program that is utilized to control temperature, flow and other process variables. Given the prior information and desired result, a programmer skilled in the art can program the computer. Thus, heating means other than RF may be used, such as electrical resistance or gas, for example. The important quantities to be measured or used is the gross temperature of the reactor and the surface temperature of the reactor and the surface temperature of the object being heated, such as the semiconductor wafer, or for gas phase reactions, an area of the reactor itself. The means for obtaining the error signals need not be as complex as an IBM 1800 system. The method disclosed is applicable beyond epitaxial growth processes, but to general heating systems and problems.

What is important is that signals representative of the temperatures involved be generated so that error signals may be generated for correcting the heat input to the reactor. The heat energy input controllers, of course, may be responsive to more than one signal, as shown in the specification, where the signal from the RF pickup coil is combined with the error signal to allow a correction to be made.

Further, certain situations are evident where the "object to be heated" is a specific zone in the reactor, rather than an object such as the semiconductor wafer. Thus, for gas reactors requiring certain temperature minimums or maximums, for disassociation or association, the temperature of a given zone in the reactor would be sensed.

While the invention has been particularly shown and described with reference to preferred embodiments thereof, it will be understood by those skilled in the art that various changes in form and details may be made therein without departing from the spirit and scope of the invention.

I claim:

1. A system for obtaining a desired temperature of an object being heated in a reactor, comprising:
    a reactor;
    energy input means for heating said reactor;
    thermocouple sensing means located adjacent said reactor to sense a gross temperature related to the internal temperature of said reactor, said thermocouple sensing means generating a voltage related to the temperature sensed;
    optical sensing means focused upon the object to be heated within said reactor, said optical sensing means generating a voltage related to the temperature of the object upon which it is focused;
    means for generating a first set point voltage, related to the temperature at which it is desired to heat the object being heated;
    first comparing means for comparing said first set point voltage with said optically sensed voltage, the difference between said first set point voltage and said optically sensed voltage constituting a first error voltage;
    means for generating a $K$-factor comprising the sum of the prior occurring $k$-factor and the prior occurring first error voltage, the initial $K$-factor at time equal to zero being made equal to said thermocouple sensed voltage at time equal to zero;
    second comparing means for adding said first error voltage and said $k$-factor, the sum constituting a second set point voltage;
    third comparing means for comparing said second set point voltage with said thermocouple sensed voltage, the voltage difference constituting a second error voltage; and
    heat supply control means for controlling the energy input to said reactor, said heat supply control means responsive to said second error voltage to adjust the energy input to said reactor to control the temperature of the object being heated.

2. The system of claim 1 wherein said heating means is an RF heating unit.

3. The system of claim 1 wherein said thermocouple sensing means comprises a thermocouple embodied in a dummy block located externally adjacent said reactor.

4. The system of claim 2 wherein said thermocouple sensing means comprises a thermocouple embodied in a dummy block located externally adjacent said reactor and between the induction coils of said RF heating unit and said reactor.

5. The system of claim 1 wherein said optical sensing means is a radiation pyrometer.

6. The system of claim 1 wherein said optical sensing means is an optical pyrometer.

7. The system of claim 1 wherein said optical sensing means is corrected for emissivity errors.

8. The system of claim 1 including sampling means to allow input from thermocouple sensing means and said optical sensing means to said first and third comparing means to occur at predetermined time intervals.

9. The system of claim 1 including hold means responsive to said second error voltage, to maintain a constant error voltage input signal to said heat supply control means for a predetermined time interval.

10. The system of claim 1 wherein said means for generating said first set point voltage includes means allowing said first set point to be varied to reflect a desired related temperature to which the object is to be heated.

11. The system of claim 1 including means for introducing a desired gas into said reactor.

12. The system of claim 1 wherein said object to be heated comprises a zone within said reactor.

13. A system for obtaining a desired temperature of a semiconductor wafer in an epitaxial growth system wherein said wafer is being heated in a reactor, including means for introducing a desired gas into said reactor, comprising:
    energy input means for heating said reactor;
    thermocouple sensing means located adjacent said reactor to sense a gross temperature related to the internal temperature of said reactor, said thermocouple sensing means generating a voltage related to the temperature sensed;
    optical sensing means focused upon the semiconductor wafer within said reactor, said optical sensing means generating a voltage related to the temperature of the wafer upon which it is focused;
    means for generating a first set point voltage, related to the temperature at which it is desired to heat the wafer being heated;
    first comparing means for comparing said first set point voltage with said optically sensed voltage, the difference between said first set point voltage and said optically sensed voltage constituting a first error voltage;
    means for generating a $K$-factor comprising the sum of the prior occurring $K$-factor and the prior occurring first error voltage, the initial $K$-factor at time equal to zero being made equal to said thermocouple sensed voltage at time equal to zero;
    second comparing means for adding said first error voltage and said $K$-factor, the sum constituting a second set point voltage;
    third comparing means for comparing said second set point voltage with said thermocouple sensed voltage, the voltage difference constituting a second error voltage; and
    heat supply control means for controlling the energy input to said reactor, said heat supply control means responsive to said second error voltage to adjust the energy input to said reactor to control the temperature of the semiconductor wafer being heated.

14. A method for controlling the temperature of an object being heated in a heating system, said heating system comprising a reactor, energy input means for heating said reactor, and heat supply control means responsive to a voltage input to adjust the energy input to said reactor, comprising the steps of:
    placing a thermocouple sensing means adjacent said reactor, to sense a gross temperature related to the internal temperature of said reactor, said thermocouple sensing means generating a voltage related to the temperature sensed;
    focusing an optical sensing means upon the object to be heated within said reactor, said optical sensing means generating a voltage related to the temperature of the object upon which it is focused;
    generating a first set point voltage, related to the temperature at which it is desired to heat the object to be heated;
    comparing said first set point voltage with said optically sensed voltage, the difference between said first set point voltage and said optically sensed voltage constituting a first error voltage;
    generating a $K$-factor comprising the sum of the prior occurring $K$-factor and the prior occurring first error voltage, the initial $K$-factor at time equal to zero being made equal to said thermocouple sensed voltage at time equal to zero;

adding said first error voltage and said $K$-factor, the sum constituting a second set point voltage;

comparing said second set point voltage with said thermocouple sensed voltage, the voltage difference constituting a second error voltage;

entering said second error voltage into said heat supply means, wherein said heat supply control means adjusts the energy input to said reactor to control the temperature thereof.

15. The method of claim 14 wherein said object to be heated comprises a zone within said reactor.

16. A method for determining the error correction necessary to obtain a desired temperature of an object being heated in a reactor, the error correction being used for adjusting the heat input to the reactor, comprising the steps of:

placing a thermocouple sensing means adjacent said reactor, to sense a gross temperature related to the internal temperature of said reactor, focusing an optical sensing means upon the object within said reactor, to sense a temperature related to the internal temperature of said reactor;

focusing an optical sensing means upon the object within said reactor, to sense a temperature related to the temperature of the object upon which it is focused;

determining a set point temperature to which it is desired to heat the object;

subtracting the optically sensed temperature from the set point temperature to obtain a first temperature error correction;

determining a $K$-factor comprising the sum of the prior occuring $K$-factor and the prior occurring first temperature error correction, the initial $K$-factor at time equal to zero being made equal to said thermocouple sensed temperature at time equal to zero;

adding said first temperature error correction and said $K$-factor, the sum constituting a second set point temperature;

subtracting said thermocouple temperature from said second set point temperature to obtain a final temperature error correction, said final temperature error correction indicating the amount of adjustment needed to heat the input to the reactor to obtain the desired temperature of the object.

PO-1050
(5/69)

UNITED STATES PATENT OFFICE
CERTIFICATE OF CORRECTION

Patent No. 3,567,895 (849,029)    Dated   March 2, 1971

Inventor(s) Oded Paz

It is certified that error appears in the above-identified patent and that said Letters Patent are hereby corrected as shown below:

| | | |
|---|---|---|
| Column 1, | line 21 | That part of the formula reading "1150- should read --1150-1250°C--. |
| | line 47 | "350kHz." should read --350KHz.--. |
| Column 4, | line 58 | " a k" should read --a K--. |
| Column 4, | line 61 | After "signal" delete "73$_2$" and substit therefor --$\Theta_2$--. |
| Column 5, | line 25 | "at time = t" should read --at time = t |
| | line 28 | That portion of the formula which reads "$R_1(t)$" should read --$R_1(t_0)$--. That portion reading "1200°-" should read --1200°-1180°--. |
| | line 30 | That portion of the formula reading "$E_1(t)$" should read --$E_1(t_0)$--. |
| | line 31 | That portion of the formula reading "$R_2(t)-\Theta_2(ta[0]$" should read --$R_2(t_0)-\Theta_2(t_0)$--. |
| | line 34 | "at time = t" should read --at time = t |
| | line 37 | That portion of the formula reading "(ta should read -- $(t_0+T)$--. |
| | line 38 | That portion of the formula reading "(t should read --$(t_0)$ |
| | line 39 | That portion of the formula reading "(t+T) + k($t_0$T)" should read --$(t_0+T)$ + k($t_0+T$)--. |
| | line 40 | "$R_2$(t+T) should read --$R_2(t_0+T)$-- |

PO-1050
(5/69)

UNITED STATES PATENT OFFICE
CERTIFICATE OF CORRECTION

Patent No. 3,567,895      Dated March 2, 1971

Inventor(s) Oded Paz      PAGE - 2

It is certified that error appears in the above-identified patent and that said Letters Patent are hereby corrected as shown below:

| | |
|---|---|
| Column 6, line 38 | After "poles at" delete "=" and subs therefore --+--. |
| line 44 | Formula 9, that portion reading "(1-z- should read --(1-z$^{-1}$)--. |
| Column 8, line 76 | Delete "$T_b$')" and substitute therefor --($T_B$')--. |
| Column 9, line 5 | In the formula, that part reading "+$\alpha$T should read --$\Delta$T--. |
| Column 9, line 4 | After "wall" delete "$\alpha$T" and substitut therefor --$\Delta$T--. |
| Column 10, line 11 | After "and" delete "4(t)" and substitu therefor --x(t)--. |
| Column 10 | Formula (20) That portion of the form reading "$\dfrac{d^k x(t)}{dt^k}$" should read --$\dfrac{d^k x(t)}{dt^k}$-- |

Signed and sealed this 13th day of June 1972.

(SEAL)
Attest:

EDWARD M. FLETCHER, JR.      ROBERT GOTTSCHALK
Attesting Officer      Commissioner of Patents